United States Patent [19]

Retallick

[11] 4,402,871

[45] Sep. 6, 1983

[54] METAL CATALYST SUPPORT HAVING HONEYCOMB STRUCTURE AND METHOD OF MAKING SAME

[76] Inventor: William B. Retallick, 1432 Johnny's Way, West Chester, Pa. 19380

[21] Appl. No.: 367,473

[22] Filed: Apr. 12, 1982

Related U.S. Application Data

[63] Continuation-in-part of Ser. No. 223,641, Jan. 9, 1981, abandoned.

[51] Int. Cl.³ .............................................. B01J 35/04
[52] U.S. Cl. ................................ 252/477 R; 428/593
[58] Field of Search ................... 252/477 R; 156/197; 428/593

[56] References Cited

U.S. PATENT DOCUMENTS

| | | | |
|---|---|---|---|
| 3,891,575 | 6/1975 | Brautigam et al. | 252/455 R |
| 4,098,722 | 7/1978 | Cairns et al. | 252/477 R |
| 4,162,993 | 7/1979 | Retallick | 252/477 R |
| 4,190,559 | 2/1980 | Retallick | 252/477 R |
| 4,247,422 | 1/1981 | Davies | 252/477 R |

OTHER PUBLICATIONS

*Primary Examiner*—W. J. Shine
*Attorney, Agent, or Firm*—Paul & Paul

[57] ABSTRACT

A honeycomb catalyst support is formed by folding a single strip of metal back and forth upon itself. Each layer in the honeycomb has indentations of uniform height, so that the spacing between layers is equal to this height. A different pattern of indentations is used in alternate layers, and the indentations are on opposite sides of the strip in alternate layers. This prevents the indentations in successive layers from coinciding and nesting together.

14 Claims, 3 Drawing Figures

METAL CATALYST SUPPORT HAVING HONEYCOMB STRUCTURE AND METHOD OF MAKING SAME

CROSS REFERENCE TO OTHER APPLICATION

This is a continuation-in-part of U.S. patent application Ser. No. 223,641, filed Jan. 9, 1981, now abandoned.

BACKGROUND OF THE INVENTION

This invention relates to metal catalyst supports. Such supports comprise metal "skeletons" which are coated with catalyst, and through which gas flows. The catalyst support must allow the catalyst to contact the gas without impeding the flow of gas. Examples of such supports are given in my prior U.S. Pat. Nos. 4,162,993, 4,190,559, and 4,301,039, the disclosures of which are incorporated by reference herein.

If one must treat catalytically the flue gas from an electric power plant, the flow of gas is enormous, and so is the cross sectional area of the catalyst. The preferred shape of the catalyst support for treating flue gas is a rectangle. Individual rectangles can be nested together like panes in a window, to fill a large cross section. U.S. Pat. No. 4,190,559 describes a method of stacking separate strips to form rectangular catalyst supports. In the present invention the rectangles are formed by folding a single strip of metal upon itself. This gives a more rigid honeycomb.

SUMMARY OF THE INVENTION

The present invention discloses a method of making a metal catalyst support from a continuous strip of metal. In this method the strip is passed between two pairs of indenting rollers, which are alternately engaged and disengaged. The strip is then guided by a third set of rollers, the strip being payed back and forth, so as to create a honeycomb structure from one strip of metal. Each layer in the honeycomb has indentations of uniform height, so that the spacing between layers is equal to this height. A different pattern of indentations is used in alternate layers, and the indentations are on opposite sides of the strip in alternate layers. This prevents the indentations in successive layers from coinciding and nesting together.

It is an object of the invention to provide a rectangular honeycomb catalyst support that is made from a single strip of metal.

It is another object to provide a honeycomb catalyst support that is made from a single strip of metal, wherein the cross section is circular, triangular, or hexagonal, or any desired shape.

It is another object to provide a method for forming a honeycomb catalyst support from a single strip of metal, a method that can be adapted to high speed production.

Other objects and advantages of the invention will be apparent to those skilled in the art, from a reading of the following brief description of the drawings, the detailed description of the invention, and the appended claims.

DETAILED DESCRIPTION OF THE INVENTION

Figure 1:
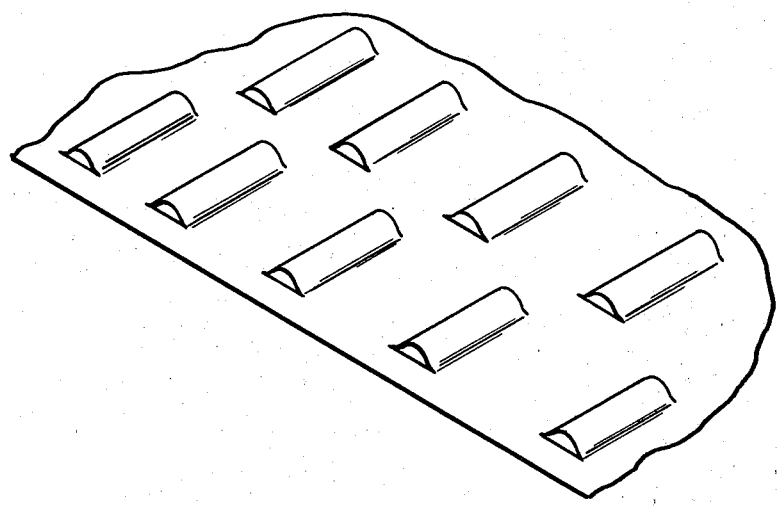
FIG. 1 is a perspective view of a fragmentary portion of a single strip showing first and second rows of indentations of uniform height.

FIG. 1 shows the preferred shape for the indentations. This shape is cylindrical, which means that the surface is generated by a straight line that remains parallel to its original position as it generates the surface. The ends of the indentations are open. The indentations are aligned perpendicular to the length of the strip and are therefore perpendicular to the face of the honeycomb. The indentations present only the edge of the indented metal to the gas flowing through the honeycomb. As seen in FIG. 1 (and also as shown and claimed in U.S. Pat. No. 4,162,993, cited above), the indentations are of uniform height, so that the spacing between layers of the honeycomb is equal to this height.

Figure 2:
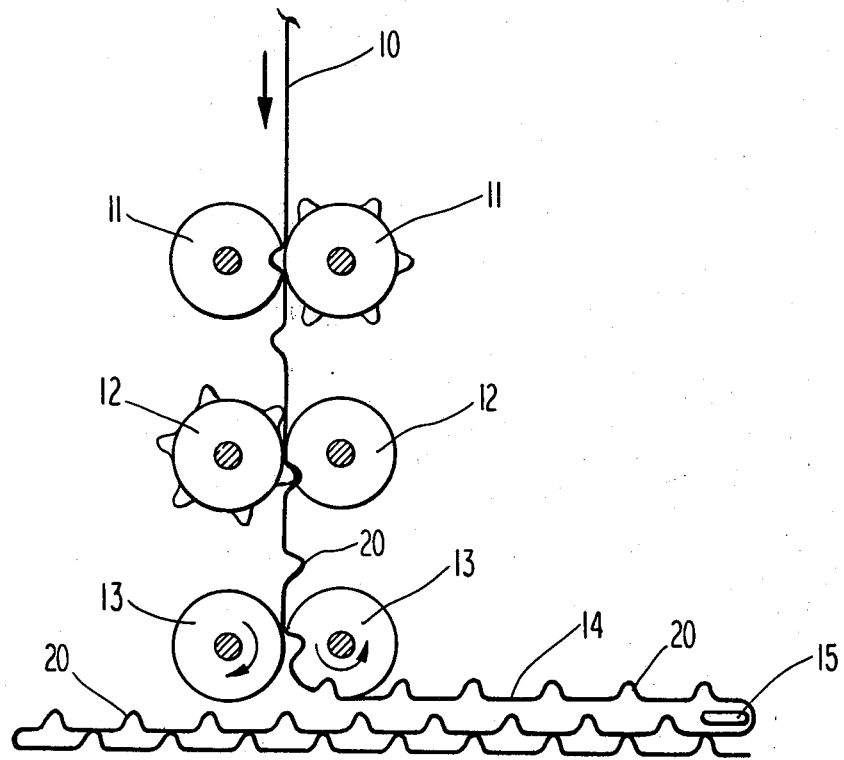
FIG. 2 is an elevational view showing a layer being laid upon the honeycomb being formed.
Figure 3:
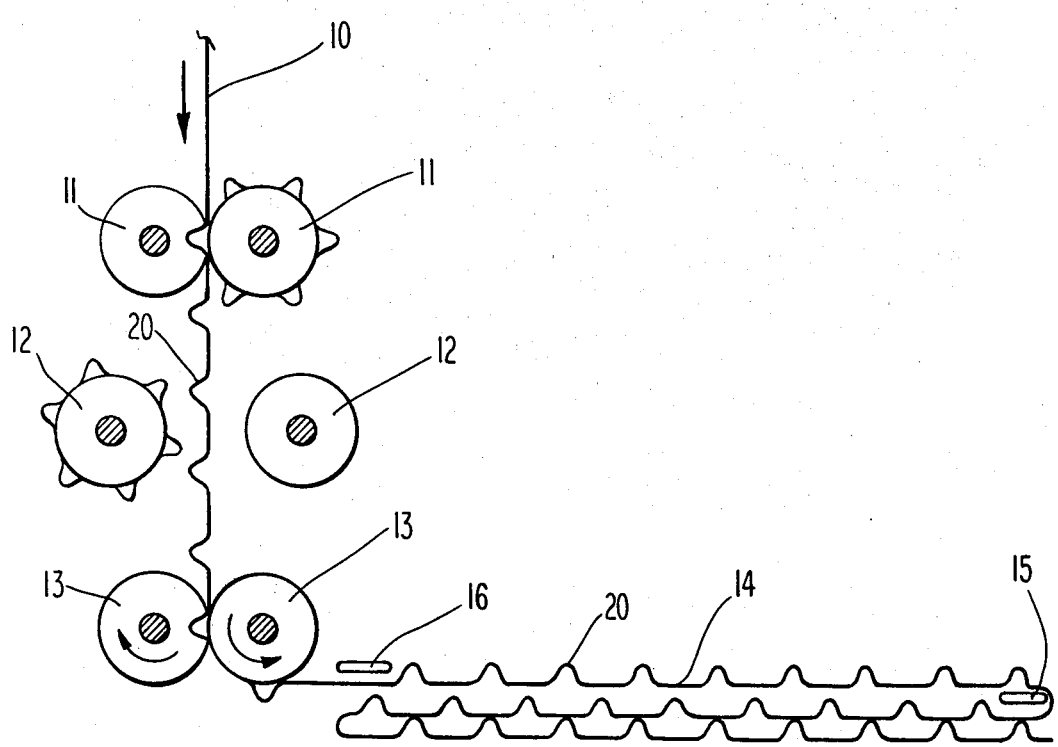
FIG. 3 is an elevational view showing the next layer about to be laid down.

In FIGS. 2 and 3 the metal strip 10 passes first through indenting rollers 11 and 12, and then through soft gripping rollers 13. Rollers 13 have rims of soft rubber, or spongelike material that will not crush the indentations. Rollers 11, 12 and 13 can be mounted on the same carriage, so that they travel together across the side of the honeycomb as the layers of metal strip are laid upon the honeycomb. The carriage, not shown, is of conventional design, and is capable of moving the rollers back and forth. The rollers thus can be moved as a unit, with oscillatory motion of varying amplitude. The rollers can be separated and closed by conventional means, not shown.

In FIG. 2, layer 14 is being laid upon the honeycomb. The indentations 20 have previously been formed by rollers 11 and 12, the respective rollers impressing indentations on opposite sides of the strip 10. Rollers 12 are about to part because they have indented almost enough of strip 10 to complete layer 14. A finger 15 is in position under layer 14 that is being payed out by rollers 13. Layer 14 is in tension between rollers 13 and finger 15.

In FIG. 3, layer 14 is complete and finger 16 has been moved into position on top of layer 14. Indenting rollers 11 remain closed upon the strip 10, and are indenting the layer that is about to be laid down. Rollers 11, 12, and 13 are about to reverse the direction of their rectilinear motion, to lay down this next layer. Finger 16 will remain in place while this next layer is being laid down. Finger 15 is removed before this layer has been completed, to avoid making a lump in the finished honeycomb. The fingers can be inserted and removed manually, or by mechanical means. As the carriage moves to the right, in FIG. 3, rollers 11 separate, and rollers 12 remain separated until the indentations previously formed by rollers 11 pass rollers 12. Then rollers 12 are closed, so as to prepare the strip with indentations for the next layer. Of course, after a pre-determined amount of strip has passed through, rollers 11 are closed again to prepare for the next layer. This process is thus repeated to build up the honeycomb.

It is noted that, although the indentations 20 are impressed upon opposite sides of strip 10, all indentations are oriented, in the final product, in the same direction. This is because the carriage (not shown) is programmed to reverse the direction of rectilinear travel of the rollers with each change in orientation of the indentations on the strip. The strip is thus folded at the junction between the patterns of indentations formed by rollers 11 and 12.

It is important to stagger the indentations impressed by the respective rollers, so as to prevent adjacent layers from nesting together.

The strip can be coated with catalyst before or after it is formed into the honeycomb, as described in my patents cited above.

If the carriage, which holds rollers 11, 12, and 13, is programmed to stop at the same positions after completing each layer, the layers will be of equal length, and the honeycomb will be a rectangle. The rollers can be programmed to stop at a different position after completing each layer, and in this way different cross sections can be generated, say, circles, triangles, and hexagons. In fact, catalyst supports of an infinite variety of cross sections can be produced, by suitable programming of the carriage. By "programming," it is meant that the carriage can, by conventional means, be set to move back and forth automatically, with varying amplitude of oscillation. But it is understood that the carriage can also be moved manually, and that the "programming" can thus be accomplished by manual means. In either case, the resulting product is a honeycomb catalyst support made of a single strip of metal.

In FIGS. 2 and 3, layer 14 is longer than the distance between rollers 11 and 12. Layer 14 may also be equal to, or less than, the distance between rollers 11 and 12. In the case where layer 14 is longer than this distance, the sequence for opening and closing the rollers is as described above.

In the case where layer 14 is equal to the distance between rollers 11 and 12, rollers 11 and 12 are made to open and close together. The rollers simultaneously indent the strip, and then, upon disengagement, allow the strip to advance until the last of the indentations passes rollers 12. At this point, the rollers re-engage.

Layer 14 can also be made to be less than the distance between roller 11 and 12, by programming rollers 11 to open before the leading end of the pattern of indentations reaches rollers 12. Rollers 12 are then programmed to close when the portion of the strip which is not indented arrives at rollers 12. Thus, by suitable programming of the rollers, the length of layer 14 can be greater than, equal to, or less than the distance between rollers 11 and 12.

It is thus seen that the method of the present invention comprises the steps of folding a strip of metal back and forth upon itself, while impressing first and second patterns of indentations on opposite sides of the strip. These indentations are of uniform height, so that the spacing between layers is equal to this height. Furthermore, the spacing between indentations in the first and second patterns is different so that indentations in successive layers cannot coincide and nest together. It is also noted that, as is clear from FIGS. 2 and 3, the height of the catalyst support is substantially equal to the height of the indentations multiplied by the number of layers.

The patterns that are indented on opposite sides of the strip can be made to differ, for example, by changing the spacing between the indentations along the strip, or by changing the spacing between the rows of indentations and the edge of the strip.

In another embodiment of the invention, indentations can be stamped in the strip by reciprocating punches instead of by rollers. The punches would operate with motion analogous to that of a sewing machine, i.e. they would repeatedly stamp and advance the strip.

It is seen that the objects of the invention are fulfilled by the present disclosure. Many modifications are possible, such as the spacing and shape of the indentations, the width of the strip used, and the type of indenting mechanism. All such modifications are considered to be within the spirit and scope of the following claims.

What is claimed is:

1. A method of making a metal catalyst support, comprising the steps of:
   (a) folding a strip of metal back and forth upon itself, while
   (b) impressing first and second patterns of indentations on opposite sides of the strip, the indentations being of uniform height so that the spacing between layers is equal to this height, the spacing between the indentations in the first and second patterns being different so that the indentations in successive layers cannot coincide and nest together.

2. The method of claim 1, wherein the catalyst support has rectangular cross section.

3. The method of claim 1, wherein the catalyst support has non-rectangular cross section.

4. The method of claim 1 or 2, further comprising the step of coating the strip with catalyst.

5. A method of making a honeycomb catalyst support from a single strip of metal, comprising the steps of:
   passing the strip alternately through first and second pairs of indenting rollers, whereby first and second patterns of indentations alternate along the strip, the indentations being of uniform height, so that the spacing between layers is equal to this height, the spacing between the indentations in the first and second patterns being different, the first and second patterns of indentations being on opposite sides of the strip, and
   folding the strip back and forth upon itself, the folds being at the junction between the first and second patterns, whereby the indentations in successive layers cannot coincide and nest together.

6. The method of claim 5, wherein the catalyst support has rectangular cross section.

7. The method of claim 5, wherein the catalyst support has non-rectangular cross section.

8. The method of claim 5 or 6, further comprising the step of coating the strip with catalyst.

9. A metal catalyst support comprising a single strip of metal folded back and forth upon itself, the strip having indentations on opposite sides of the strip, the indentations on one side of the strip having a different spacing from that of the indentations on the other side of the strip so that the indentations in successive layers cannot coincide and nest together, and wherein the height of the support is substantially equal to the height of the indentations multiplied by the number of layers.

10. The catalyst support of claim 9, wherein the strip is folded such that substantially all the indentations are oriented in the same direction.

11. The catalyst support of claim 10, wherein all the indentations are of substantially the same height.

12. The catalyst support of claim 11, wherein the catalyst support has rectangular cross section.

13. The catalyst support of claim 11, wherein the catalyst support has non-rectangular cross section.

14. The catalyst support of claim 12, or 13, wherein the catalyst support is coated with catalyst.

* * * * *